Dec. 30, 1947.  T. K. CHECKOS  2,433,431
WELDING ROD HOLDER
Filed Aug. 26, 1943
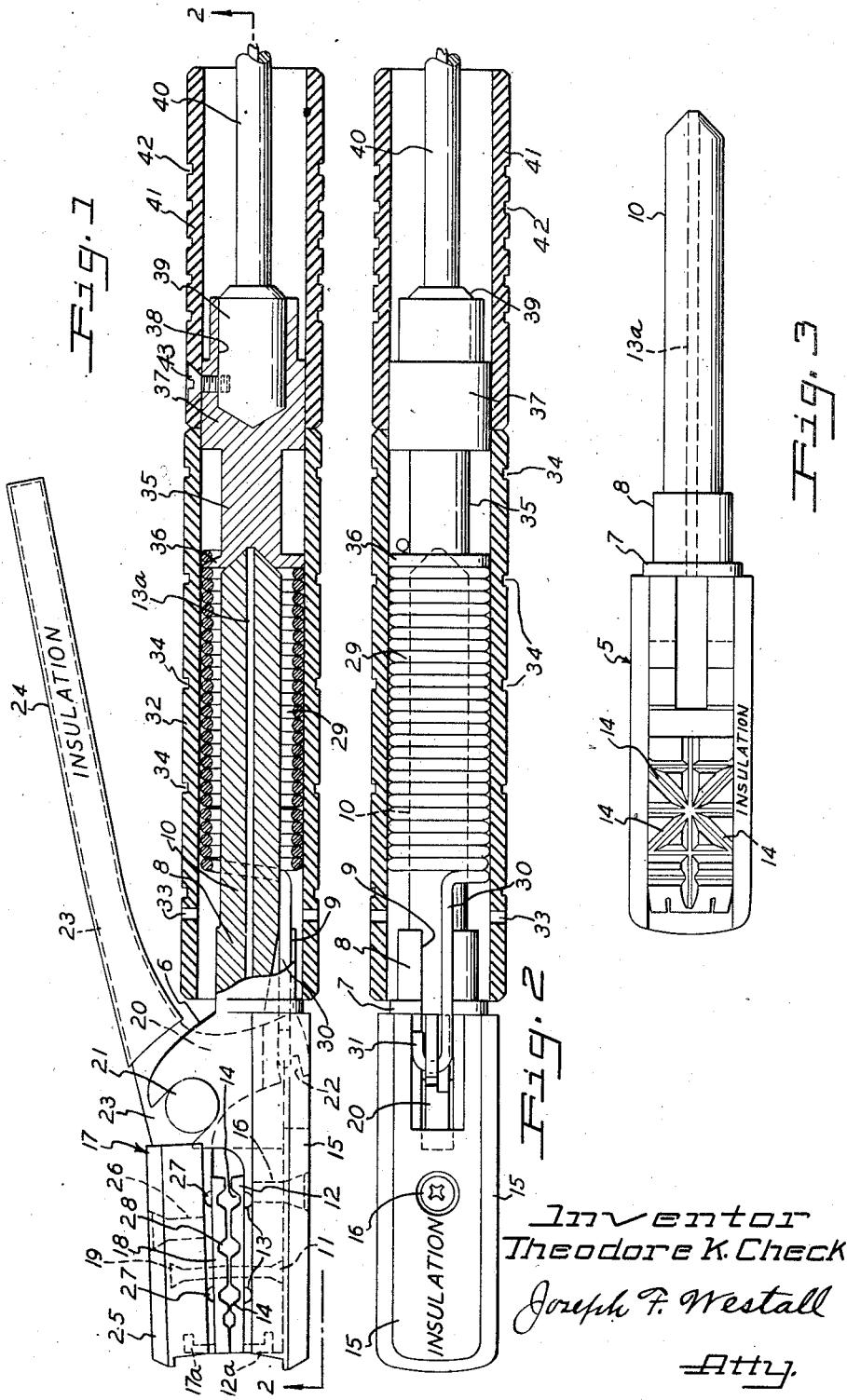
Inventor
Theodore K. Checkos
Joseph F. Westall
Atty.

Patented Dec. 30, 1947

2,433,431

UNITED STATES PATENT OFFICE 2,433,431

WELDING ROD HOLDER

Theodore K. Checkos, Los Angeles, Calif.

Application August 26, 1943, Serial No. 500,081

3 Claims. (Cl. 219—8)

This invention relates to welding rod holders of the general character commonly employed in electric welding for the dual purpose of providing a handle for the manipulation of the rod and means for releasably connecting a plug on the end of an electric cable furnishing the current necessary for the welding operation.

It is a principal object of the present invention to provide a comparatively light, well balanced, thermally and electrically insulated, easily manipulated holder, which will facilitate seizing the electrode-welding-rod at any part of its length and positioning it at any desired angle with respect to the handle, releasing, re-positioning, or replacing the rod and applying it in any of the various welding operations at the most conveniently workable angle.

Incidental to the last-mentioned objects, it is also an important purpose of the present invention to provide convenient and easily manipulable means for connecting and adjusting the spring-tension of the rod-holding jaws.

Simplicity of assemblage and disassemblage of principal parts for repair or replacement is also an important object, as is likewise the provision for removable jaw-facings; which are made interchangeable to permit the use of specially grooved faces for various operations.

Other objects and corresponding advantages, such as fewness of parts, economy of manufacture, ruggedness, positive assurance of good electric contacts and durability in use will be apparent to those of skill in the art upon an examination of the following description read in the light of the accompanying drawings in which:

Fig. 1 is a view partly in elevation and partly in longitudinal section;

Fig. 2 is a view on line 2—2 of Fig. 1, partly in section and partly in elevation;

Fig. 3 is a plan view of the lower jaw member with attached parts.

Referring to the drawings in which like numerals designate corresponding parts throughout the several views, 5 indicates the lower jaw-member having a pair of spaced apart bearing members 6 (for later described trunnions) extending laterally toward the upper jaw member. Collar-mandrel 7 (for frictionally removably holding the tubular insulating handle later described) is preferably integral with trunnion-bearing member 6—6; and said mandrel 7 carries a cylindrical extension 8, which extension, as well as collar-mandrel 7, is provided with a longitudinal groove 9. Core 10 (for the tension spring later to be described) coaxially extends preferably integral with extension 8 of lower jaw-member 5.

Lower jaw-member 5 is bored from its outer surface through its inner face, which bore is tapped to receive screw 11, which screw extends through said last-mentioned bore and into a correspondingly tapped bore in face-plate 12, which is superposed upon the clamping surface of lower jaw-member 5. To further secure face-plate 12 from lateral displacement, the outer end of lower jaw-member 5 is provided with a dovetail mortise into which fits a depending tenon at the outer end of face plate 12, as shown at 12a.

Air-circulation grooves 13—13 transversely extend across the inner surface of lower jaw-member 5 between such surface and the lower surface of face-plate 12, and 13a is an air-circulation bore through members 7, 8, and 10 of the lower jaw assembly. Face-plate 12 on said lower jaw-member is provided with a multiplicity of grooves 14—14 (most clearly shown in Fig. 3), longitudinally, transversely, and diagonally disposed in its clamping surface for the purpose of gripping a welding-rod-electrode in any of a plurality of desired positions with respect to the welding-rod-holder, as will later more clearly appear.

A cover 15 of insulating material is grooved to enclose the outer surface of lower jaw-member 5, said cover 15 being bored to receive countersunk screw 16 which extends in a tapped hole into member 5, thus securing said insulating cover 15 to said lower jaw-member 5.

Upper jaw-member 17 is provided with a face-plate 18 secured to the clamping surface of said jaw-member by screw 19 in a tapped hole through said jaw-member 17 and into said face-plate 18, being further secured from lateral displacement on the face of said jaw-member 17 by mortise and tenon 17a, of identical construction as that heretofore described in relation to lower jaw-member 5.

Preferably integral with the inner end of upper jaw-member 17 is lever-arm 20, carrying coaxially laterally extending trunnions 21 (one of which is clearly shown in Fig. 1). Adjacent its outer end, lever-arm 20 is notched as shown at 22 (Fig. 1) into which notch an end of the tension spring later to be described is engaged.

Extending from lever-arm 20 is a lever-handle 23 for opening the jaws against the tension of the spring later to be described. Lever-handle 23 is enclosed within a cover 24 of insulating material.

Upper jaw-member 17 is provided with a cover 25 which is grooved and fitted to enclose the outer surface of upper jaw-member 17, being bored to receive a countersunk screw 26 which extends in a tapped hole into upper jaw-member 17, thus securing cover 25 to said jaw-member. Said upper jaw-member 17 is also provided with air-circulation grooves 27—27 transversely extending across the inner surface of upper jaw-member 17 between such surface and the lower surface of face-plate 18. Face-plate 18 on said upper jaw-member 17 is provided with a multiplicity of grooves 28—28, longitudinally, transversely, and diagonally disposed in its clamping surface, and in alignment with corresponding grooves 14—14 of face plate 12 of lower jaw-member 5 for the purpose of gripping the welding-rod-electrode in any of a plurality of desired positions with respect to the welding rod holder, as will be obvious from the foregoing description of like grooves in faceplate 11 of lower jaw-member 5.

Tension spring 29 is provided with an extension 30 at its end and is bent to form hook 31, which hook is adapted for engagement in notch 22 of the outer lateral end of lever-arm 20 of upper jaw-member 17, tension-spring 29 being assembled so as to surround core 10 which extends from lower jaw-member 5.

A tubular handle 32 of fiber or other suitable insulating material is telescoped over tension spring 29 in its assembled position as above described, said tubular handle 32 being held frictionally removable on collar-mandrel 7 over which it telescopes. Air circulation holes 33 are spaced around adjacent the extension 8 of lower jaw-member for cooling purposes. Tubular handle 32 is provided with a series of annular grooves 34 for gripping purposes as well as to facilitate cooling. To place spring 29 under desired tension, and to regulate such tension, as well as to permit quick disassemblage of parts, tension-member 35 at its inner end is provided with a flange 36 of the approximate outside diameter of spring 29, which flange 36 extends for a greater part of its circumferential length concentrically around said inner end of tension member 35, which flange 36 is cut away at one portion to provide an opening through which an adjoining end of tension spring 29 may pass, the spaced apart ends (left by said cutting away of said flange 36) being ground to provide spaced apart parallel inclined planes facing in opposite directions. Each of said spaced-apart adjoining ends of the inclined planes are ground to an edge so as to be easily forced by rotation of tension-member 35 between adjacent convolutions of tension-spring 29; in other words said flange 36, although of the same outside diameter of tension spring 29, is cut away, ground to corresponding parallel inclined planes with end edges sharpened to form a screw thread which can be rotated into convolutions of said tension spring 29 so as to pull said tension spring in extended form to provide tension.

At its outer end 37 tension-member 35 is increased in its cylindrical diameter so as to loosely fit within a separate extension (later to be described) of tubular insulating handle 32.

Concentrically bored into end 37 of tension-member 35 is a socket 38 to receive a plug 39 secured by any means well known to the art to the end of electric cable 40. Tubular-handle-extension member 41 is of the same insulating composition and for the same purpose as tubular handle 32, and is provided with annular grooves 42 for the same purposes as heretofore described with reference to grooves 34 in said handle.

Tubular-handle-extension 41 is bored and counter-sunk adjacent its inner end to receive the head of screw 43 which is screw threaded into a bore through end 37 of tension-member 35, and which extends into socket 38 in said end member. Said screw 43 performs the double function of securing tubular-handle-extension 41 non-rotatively to end 37 of tension member 35, and also as a set-screw to hold and retain plug 39 of the electric cable removably in socket 38.

From the foregoing description it will be obvious that after the parts have been assembled by placing the trunnions 21 (integrally part of the upper jaw assemblage) in the bearing slots of the lower jaw assembly, pushing the tension spring 29 over core 10 (part of the lower jaw assembly), and placing hook 31 of tension-spring 29 into notch 22 of lever-arm 20 of the upper jaw assemblage, telescoping tubular handle 32 over tension spring 29 and into frictional engagement with collar-mandrel 7, that tubular-handle-extension 41 with its attached tension-member 35 and integral screw-thread flange 36 may be inserted and pushed into the open end of tubular handle 32 until the ends of tubular handle 32 and tubular-handle-extension 42 are brought into contact, and then rotated so that flange 36 on tension-member 35 enters the convolutions of tension spring 29, continued rotation resulting in drawing tension spring 29 into extended position, thus providing said spring with tension of any desired degree; and that when under such tension, upper and lower jaws will relatively be urged together to contacting or closed position, and through lever-handle 23 may be opened against the said tension to receive a welding rod. Obviously the welding rod may be placed in any desired relative position with respect to the handle as may be desired, the lever handle 23 and its arrangement (operating as a spring plier) permitting simple and expeditious manipulation in seizing, placing, holding and releasing the welding rod, as operating requirements dictate.

What I claim and desire to secure by Letters Patent is:

1. In a device of the character described, a lower jaw-member provided with bearings for trunnions, an upper jaw-member carrying trunnions to engage in said bearings of said lower jaw-member, said upper jaw-member having a lever-arm extending through a slot in said lower jaw-member, a helical tension-spring, means to connect one end of said tension-spring to said lever-arm, a rotatable member carrying a screw thread adapted before tensioning of said spring to engage between convolutions adjacent an end of said spring, a stop for said rotatable member permitting its rotation but preventing its longitudinal movement relative to said spring, and means to rotate said rotatable member to force said screw thread into convolutions of said spring so as to pull apart the convolutions of said spring and thus put it under tension.

2. In a welding-rod-holder, a lower jaw-member provided with a pair of laterally extending lugs, said lugs being provided with bearing slots to receive spaced-apart trunnions, an upper jaw-member having a pair of oppositely disposed trunnions adapted for engagement in said slot-bearings, said upper jaw-member being also provided with a lever-arm extending laterally from said trunnions and into a slot in said lower jaw-member, a helical tension-spring connected at one of its ends to said lever-arm and at its other end to spring tensioning means, spring tensioning means comprising a rotatable member provided with a stop to prevent its longitudinal movement relative to said spring, and means carried by said rotatable member adapted to be forced by rotation between convolutions at the other end of said spring to provide and regulate tension of said spring.

3. In a device of the character described, a lower jaw-member comprising a clamping-jaw and laterally extending lugs carrying a trunnion-bearing-slot and a core extension; an upper jaw-member comprising a clamping-jaw, a laterally extending lever arm, a lever handle, a helical tension-spring, means connecting one end of said spring to said lever-arm, a tubular handle adapted to telescope over said tension-spring, a rotatable member carrying a screw thread adapted to be rotated between convolutions at the unattached end of said tension spring, and a tubular-handle-extension non-rotatably attached to said rotatable member and having an end adjoining said last-mentioned attachment abutting against a corresponding end of said tubular handle, whereby said tubular-handle-extension may be rotated relatively to said tubular handle to force said screw means carried by said rotatable member between convolutions of said helical spring.

THEODORE K. CHECKOS.

REFERENCES CITED

The following references are of record in the file of this patent:

UNITED STATES PATENTS

| Number | Name | Date |
|---|---|---|
| 1,812,142 | Dreyer | June 30, 1931 |
| 2,003,196 | Jackson | May 28, 1935 |
| 2,094,121 | Harvey | Sept. 28, 1937 |
| 2,145,699 | Townsend | Jan. 31, 1939 |
| 2,179,440 | Wagner | Nov. 7, 1939 |
| 2,304,321 | Wagner | Dec. 8, 1942 |
| 973,641 | Dysart | Oct. 25, 1910 |
| 1,329,384 | Eckenrode | Feb. 3, 1920 |
| 1,348,530 | Willard | Aug. 3, 1920 |
| 1,211,009 | Thornton | Jan. 2, 1917 |
| 2,186,158 | Weeks | Jan. 9, 1940 |
| 2,312,763 | Linquist | Mar. 2, 1943 |